Dec. 7, 1948. A. E. USHAKOFF 2,455,834
INFLATABLE SOLAR STILL
Filed Aug. 27, 1945

Inventor
A. E. Ushakoff
By Kimmel & Crowell
Attorneys

Patented Dec. 7, 1948

2,455,834

UNITED STATES PATENT OFFICE 2,455,834

INFLATABLE SOLAR STILL

Alexis E. Ushakoff, Newton, Mass., assignor, by direct and mesne assignments, of thirty-five per cent to Stanley A. Baron, New Orleans, La., for the benefit of himself and Frederick A. Middleton Application August 27, 1945, Serial No. 612,879

4 Claims. (Cl. 202—234)

This invention relates to inflatable solar stills for obtaining drinking water from salt water or contaminated water, utilizing the energy of the sun.

The operation of the solar still is based upon the principle that if a differential in temperature is built up between two surfaces, and the hotter surface is saturated with water, the water in the hot surface will evaporate and condense on the cooler surface. If the water contains dissolved salts or other impurities, the act of evaporation will leave such salts or impurities behind, and the water will condense on the cooler surface in pure, distilled form. In the subject invention, the differential in temperature is obtained by utilizing solar radiation as a source of heat, and sea water as a source of cold.

The general object of the invention is to provide an emergency solar still of the type described, particularly designed for the use of those who find themselves adrift upon the sea in lifeboats, or life rafts. In its preferred embodiment, the object of the invention is to make the entire still, or at least all but the smaller part, of flexible or semirigid material so that it can be folded into a small package or kit.

Other objects of the invention will appear as the following description of embodiment of the same proceeds.

Figure 1:
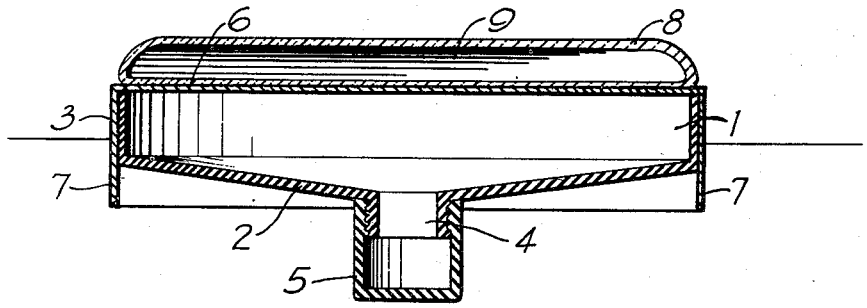
Figure 1 is a vertical sectional view of a simple form of solar still embodying the basic principles of the invention.

Referring now in detail to the several figures, and first adverting to that form of the invention shown in Figure 1, the reference character 1 represents a basin made of waterproof flexible material, such as rubber, having a bottom 2, which slopes toward the center, and an integral upstanding side wall 3. The center has a downwardly extending tubular fitting 4, externally threaded, upon which the preferably semi-rigid fresh water cup 5 screws in fluid-tight manner.

A sheet 6 of flexible fibrous material possessing high capillarity for water and high radiant heat absorbency, such as dark colored absorbent woven cotton fabric, extends in planiform relation over the top of the basin 1, and has its edges 7 overhanging the sides of said basin so as to dip into the surrounding water when the apparatus is floated in the sea. When exposed to the sun, the temperature of the heat absorbing member 6 rises, and because of the capillary property of the member 6, it becomes uniformly saturated with sea water, the temperature of which is raised due to absorption of the heat energy of the sun.

The bottom of the basin 1, hereinafter called the condensing member, is in contact with the water, and therefore at the same temperature as the water; in other words, cooler than the heat absorbing member 6. This water will evaporate from the under surface of the member 6 into the atmosphere of the basin chamber beneath the member 6, and will condense on the inner surface of the basin 1. Regardless of the salinity or other impurities in the water which saturates the heat absorbing member 6, the condensate will be fresh and pure. It is collected by gravity in the cup 5.

Since the outside water level is below the horizontal plane of the heat absorbing member, the latter will not become fully saturated and will not drip into the basin and contaminate water already distilled. In view of its capillary property, the feed of water to the head absorbing member 6 is self-regulating, and only enough water will be absorbed by the heat absorbing member to replenish the amount removed by evaporation. The operation of this solar still is therefore fully automatic. For high efficiency, the heat absorbing member 6 is preferably of pile fabric, with the pile on the underside, so as to cause the major portion of the evaporation to take place from the underside of the heat absorbing member within the basin chamber.

The bottom 2 of the basin, being flexible, is subject to undulatory movement communicated by the waves, which movement stirs the atmosphere enclosed within the basin chamber, preventing a static layer of humid air from remaining in contact with the heat absorbing member, and permitting air from the lower part of said chamber, depleted of moisture by condensation, to contact the heat absorbing member, accelerating the rate of distillation.

Preferably, the surface of the heat absorbing member 6 exposed to the sun, is covered by a transparent film or layer which allows solar radiation to pass through said layer, but which is impermeable to water vapor, so that all of the vaporized moisture from the heat absorbing member will pass into the atmosphere of the basin chamber. Since this transparent layer is subject to being splashed by the waves and thereby cooled, said transparent layer should be spaced from the heat absorbing member so as to prevent the robbing of heat from said heat absorbing member. The subject invention accomplishes this purpose by the provision of the flat bottomed double walled cover 8, which may be of transparent plastic of light weight, having the insulating air space 9. This cover rests flat upon the heat absorbing member 6, and is secured in any suitable manner, not shown.

In the preferred form of solar still, the heat absorbing member and the transparent cover therefor should be spherical. This shape is important for high efficiency, since the apparatus floating upon the water will oscillate through the action of the wind and waves and present different sides to the sun from time to time. Moreover, in its diurnal passage, the sun will shine at different angles and on different parts of the solar still. By making the heat absorbing member and the transparent cover spherical, the sun has access to the heat absorbing member, regardless of the position of the sun and of the position of orientation of the still. Such a preferred form is shown more or less diagrammatically in Figure 2. Referring to this figure, the numeral 10 represents a spherical inflatable bladder clothed on its outside with a spherical mantle 11 of heat absorbing material of high capillarity, such as that described in connection with Figure 1. The mantle 11 may be attached to the bladder 10 or a separate envelope therefor, if desired. Surrounding the heat absorbing mantle 11 and spaced therefrom is a spherical flexible inflatable transparent cover 12, the lower part of which is formed with a fresh water collecting well 13. The walls of said well are preferably semirigid. A flexible tube 14 extends through the top of the cover 12, mantle 11, bladder 10, and has its lower end terminating adjacent the lower end of the bladder. This tube is secured to the cover 12 and bladder 10 at definitely spaced points, to establish an annular spacing between the cover 12 and bladder when these members are inflated. The lower end of the bladder, together with the enveloping mantle 11, rests within the mouth of a funnel 15, connected thereto but in slightly spaced relation therefrom, by means of the bosses 16, which are unitarily secured both to the funnel and bladder. The funnel terminates in a long flexible tubular extension 17, which passes through the bottom 18 of the collecting well 13, and is secured to said bottom. The funnel therefore serve as an anchor to hold the lower part of the bladder in definite spaced relation from the cover 12, and in conjunction with the portion of the tube 14 between said cover and bladder, constitutes a means for centralizing said bladder within the cover and in uniformly spaced relation thereto when the cover and bladder are inflated. The lower end of the tube 17 is provided with a weight 19, which causes the solar still to float in upright manner.

The collecting well 13 has a tubular extension 20 controlled by a cut-off valve 21. It serves as an air inlet for inflating the cover 12, and as an outlet for discharging the pure water condensate from the collecting well 13. The tube 14 has a lateral extension 22 controlled by a cut-off valve 23, and serves as an air inlet for inflating the bladder 10 through the tube 14, and as a means for introducing a charge of salt water into said bladder. Said salt water serves as ballast for assisting in keeping the apparatus upright when floating, and to prevent this ballast from shifting, the bladder is formed with a semi-rigid partition 24 extending transversely in its lower portion defining a salt water chamber, and having a central hole 25 through which the lower end of the tube 14 extends, with lateral clearance.

The tube 14 is formed with a gooseneck 26 terminating in a nozzle 27, which enters the transparent cover 12 near the top, and opens adjacent the top of the heat absorbing mantle 11. This gooseneck may be made of semi-rigid or even rigid material, and is expanded to form a valve chamber 27' with a threaded bore 28 through which the needle valve 29 adjustably extends. By the adjustment of this needle valve the feed of salt water through the nozzle 27 upon the heat absorbing mantle 11 is regulated. It is not desirable to have water feed to the mantle 11 in great excess of the rate of evaporation; otherwise, efficiency is lost in the cooling effect of the excess water upon said mantle. Neither is it desirable to have insufficient water supplied to the mantle to replenish that removed by evaporation; otherwise salts will deposit or crystallize on the mantle, lowering its capillary capacity. It is desirable to feed a slight excess of water for its washing effect in preventing saline and other deposits.

The flexible tube 17 is open at its lower end, and extends far enough below the level of the sea to sustain a column of water sufficient to retain the small air pressure within the cover 12 incident to its inflation. Excess water fed to the mantle 11 flows into the funnel 15 and onto the top of the column within the tube 17, causing the discharge of an equal volume of water from the bottom of said column, the latter thus acting as a seal against the loss of air pressure, while at the same time, permitting the discharge of excess water.

That part of the cover 12 which is submerged is directly cooled by the sea water, and may be considered the primary condensing surface for the water vapor evaporated from the mantle 11 into the atmosphere within the space between said mantle and said cover. That part of the cover which is above water level is more or less wetted by the splashing of the waves and cooled by the breeze, so that it may be considered a secondary condensing surface. Being transparent it is not heated by the rays of the sun which pass through it. Thus, the entire surface of the cover 12 may be considered as the condensing member.

For purpose of practicability in manufacturing the apparatus, the cover 12 and bladder 10 may be molded in two parts in a diammetrical plane, as indicated by the beads 29' and 30, and subsequently united.

Figures 2, 3:
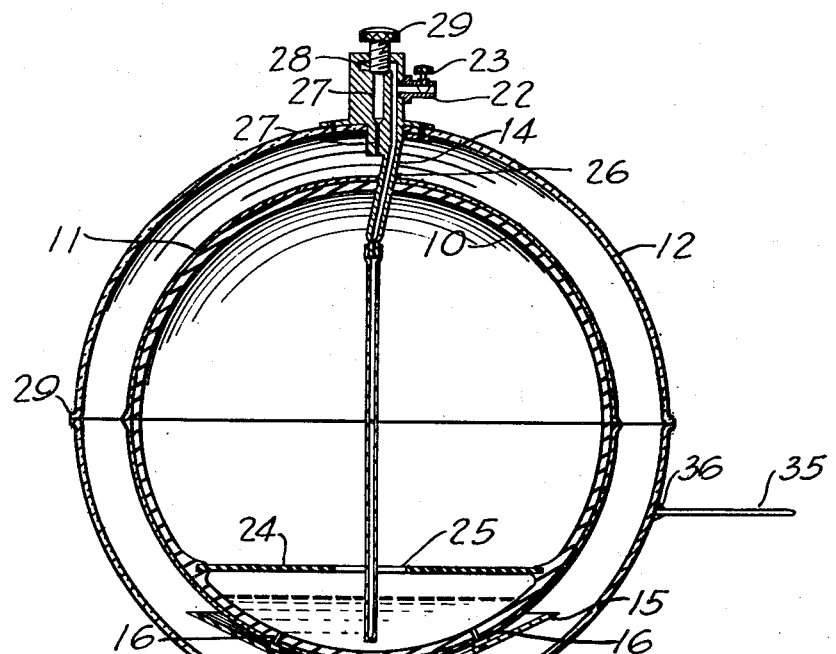
Figure 2 is a vertical section through a preferred form of solar still.
Figure 3 is a vertical section through a vessel, by means of which the solar still may be conveniently serviced.

Special means for servicing this solar still are shown in Figure 3, comprising a semi-rigid vessel 31 having a close fitting lid 32. Said lid is provided with a connection 33 adapted to be coupled to an inflating pump such as that furnished as standard equipment with inflatable life rafts, and also with an open ended tube 34, which when the cover is in place, extends to a point close to the bottom of the vessel In charging the solar still with salt water, the vessel 31 is filled with salt water, the cover put in place, the outer end of the tube 34 connected to the extension 22 of the tube 14, and the valve 23 opened. The inflating pump is attached to the connection 33 and air pressure put upon the salt water in the vessel 31. Salt water is thus displaced through the tube 34, past the valve 23, down through the tube 14, into the water space below the partition 24. At the time water is being charged into the solar still, the latter is in a flexible and limp condition. After the water has been displaced, the action of the pump is continued, inflating the bladder 10. Sufficient pressure is built up to distend the bladder 10 and the enveloping mantle into a smooth spherical form and to expel the salt water from the bladder. The valve 23 is then closed and the vessel 31 disconnected. The vessel is then connected to the extension 20, the valve 21 opened, and the cover 12 inflated. In order to retain the air until the still has been placed in the water, the flexible tube may be doubled upon itself and held in a close fold. No more pressure is accumulated than is necessary to distend the cover to spherical shape. The valve 21 is then closed and the solar still placed overboard in the water alongside the raft. It may be tethered by means of the cord 35, tied to a perforated lug 36, molded on the side of the cover 12. The feed valve 29 is now adjusted to permit the salt water to drip at the proper rate upon the mantle 11. The water is discharged from the nozzle 27 by the inflation pressure in the bladder 10. In the space of a few hours, enough fresh, pure water will have collected in the well 13 to suffice for the daily drinking needs of a man. To remove the water, the apparatus is taken on board, the tube 34 of the vessel 31 connected to the extension 20, the valve 21 opened, and the fresh water discharged into the vessel 31 through the inflation pressure of the air within the cover 12.

It is contemplated that the major parts of the apparatus shall be made of flexible or semi-rigid material, so that when empty, the entire apparatus and including the servicing vessel, may be folded or rolled into a small package or kit. The small parts, such as the valves which will not impede the folding or rolling of the apparatus into a small package, may be made of hard material, including metal.

While I have in the above description disclosed what I believe to be a preferred and practical embodiment of the invention, it will be understood to those skilled in the art that the details of construction and the arrangement of parts may be varied without transcending the scope of the invention as claimed.

What I claim as my invention is:

1. Solar still comprising inner and outer spaced spherical members defining between them a chamber, said inner member being externally clothed with a radiant-heat and water absorbing material, said outer member being adapted to float in water with its lower portion submerged, at least said lower portion being a condenser and at least upper portion being a transmitter of radiant-heat, the lower portion being provided with a distilled water collecting chamber, a tube extending through the upper wall of said outer and inner members having its lower end opening into said inner member and its upper end opening into said outer member above said inner member, a valved inlet to said tube external to said members for charging raw water into said inner member and fluid pressure for discharging the raw water from its upper end upon the radiant-heat and water absorbing material clothing said inner member, a funnel within said outer member beneath said inner member for receiving overflow of raw water from the radiant-heat and water absorbing material, said funnel having a tubular outlet extending through and at some length below the lower part of said outer member, said outer member having a valved passage through the wall thereof for admitting sufficient fluid pressure to the chamber between said members to keep the column of water in said funnel outlet dispersed below the outside water level.

2. Solar still as claimed in claim 1, including means for regulating the feed of water to said radiant-heat and water absorbing material.

3. Solar still as claimed in claim 1, said inner and outer members being flexible and assuming spherical shape under internal fluid pressure.

4. Solar still as claimed as claim 1, including a transverse baffle within said inner member having an aperture, said tube extending, with clearance, through said aperture.

ALEXIS E. USHAKOFF.

REFERENCES CITED

The following references are of record in the file of this patent:

UNITED STATES PATENTS

| Number | Name | Date |
| --- | --- | --- |
| 102,633 | Wheeler | May 3, 1870 |
| 1,812,516 | Dooley | June 30, 1931 |
| 2,398,291 | Delano | Apr. 9, 1946 |
| 2,402,737 | Delano | June 25, 1946 |
| 2,412,466 | Miller | Dec. 10, 1946 |
| 2,427,262 | Delano | Sept. 9, 1947 |

FOREIGN PATENTS

| Number | Country | Date |
| --- | --- | --- |
| 820,705 | France | Aug. 9, 1937 |